(No Model.)
E. N. FOOTE.
PROCESS OF MANUFACTURING SEAMLESS TUBE RUBBER HOSE.
No. 441,754.  Patented Dec. 2, 1890.
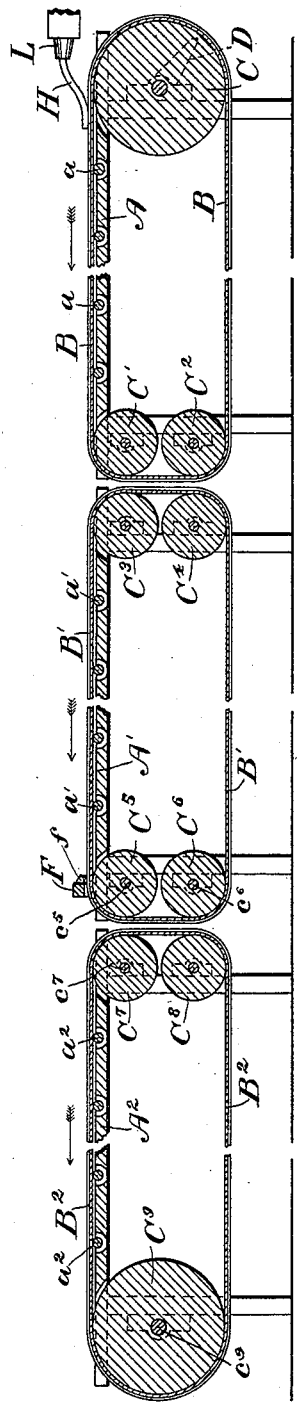
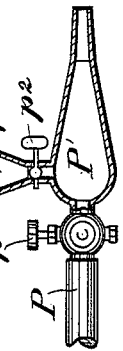
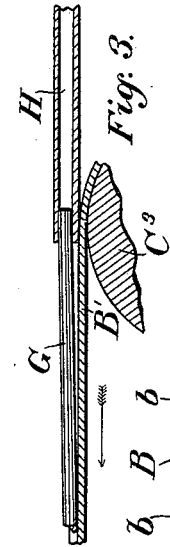
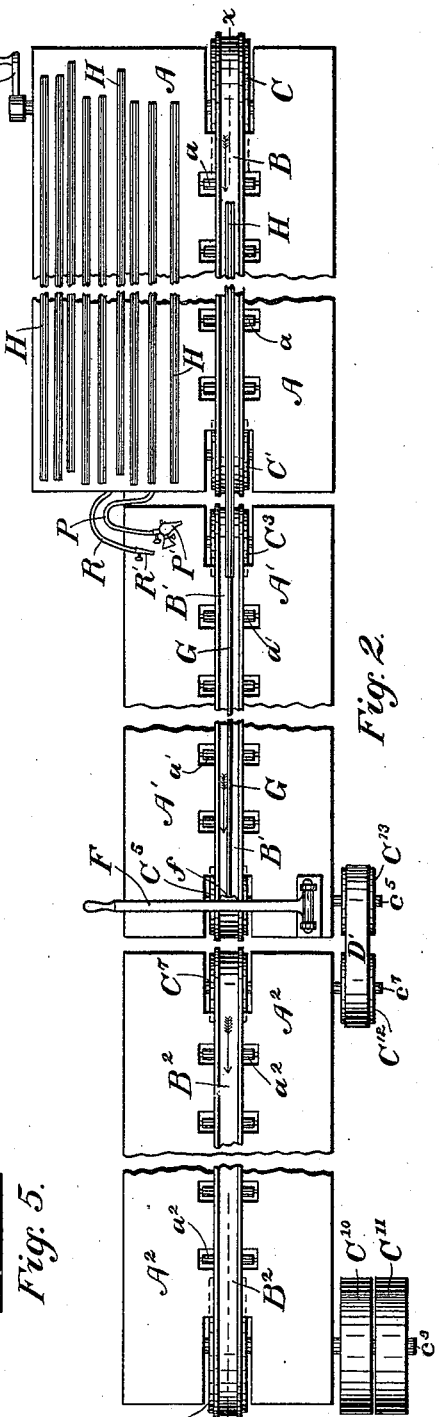
Witnesses
E. W. Gilman
Edwin J. Kratzer
Inventor
Ernest N. Foote
by Wm. B. H. Dowse
Atty.

UNITED STATES PATENT OFFICE.

ERNEST N. FOOTE, OF CLEVELAND, OHIO, ASSIGNOR TO THE CLEVELAND RUBBER COMPANY, OF SAME PLACE.

PROCESS OF MANUFACTURING SEAMLESS-TUBE RUBBER HOSE.

SPECIFICATION forming part of Letters Patent No. 441,754, dated December 2, 1890.

Application filed August 27, 1890. Serial No. 363,160. (No model.)

*To all whom it may concern:*

Be it known that I, ERNEST N. FOOTE, a citizen of the United States, residing at Cleveland, in the county of Cuyahoga and State of Ohio, have invented a certain new and useful Process for the Manufacture of Seamless-Tube Rubber Hose, of which the following is a full specification.

My invention consists especially of an improved process for forcing a rubber tube fresh from the tubing-machine onto a metal pole for the purpose of curing the said tube thereon, and thus obtaining a seamless hose of perfectly-smooth bore and of any thickness or size.

The process of curing a rubber hose by heat in a vulcanizer or heater can best be accomplished when the hose is drawn tightly over a pole or mandrel throughout its entire length. The common method of making hose, which consists in taking a strip of the rubber compound of sufficient length to form the tube, say fifty feet long, and lapping together the edges of this strip over a pole of the diameter of the hose laid along the middle of the said strip, has hitherto been the easiest and cheapest way of getting the hose on the pole. The whole, after being wrapped with a canvas or duck covering, is then taken to the vulcanizer or heater, where it remains a certain length of time till the rubber is thoroughly cured. The hose thus produced is, however, unsatisfactory on account of the longitudinal lap-weld or seam, which is constantly liable to leakage. The seamless tube produced by means of a tubing-machine wherein the rubber compound is forced out through a die by means of screw-pressure is far preferable; but it has hitherto been a very difficult matter to force this seamless tube for curing when "green" upon a pole of the same diameter, owing to the sticky gummy nature of the fresh rubber. In fact, the only method of doing this has been by hand, which is a costly operation, as it requires much time and skill. Even then it is impossible to force by hand a green tube of greater length than ten or twelve feet upon a pole or a tube of thick material or of large size.

By my improved process a tube of any size or diameter and of any desired length may be readily drawn upon a pole, the details of the process and the apparatus employed being as hereinafter described.

Of the accompanying drawings, representing the apparatus used in connection with my process, Figure 1 is a sectional elevation through the same in the plane of $x\, x$, Fig. 2. Fig. 2 is a plan view thereof. Fig. 3 shows the method of starting the hose upon the pole. Fig. 4 shows in section the construction of the soapstone nozzle employed; and Fig. 5 shows in transverse section, on an enlarged scale, one of the carrier-belts.

I in practice employ three tables $A\, A'\, A^2$ in line with each other, end to end, carrying the movable endless carrier-belts $B\, B'\, B^2$, respectively running over pulleys $C\, C'\, C^2\, C^3\, C^4\, C^5\, C^6$ and $C^7\, C^8\, C^9$, journaled in the frames of the tables. These carrier-belts are preferably provided with raised edges $b\, b$, as shown in Fig. 5, which act as guards to keep the hose upon the belt. The carrier-belts, made preferably of rubber, run over the upper surface of the tables, either resting directly thereon or running over the anti-friction rollers $a\, a'\, a^2$, let into the top of the tables. The tables are of such a length that the level surface of the carrier-belts thereon shall be of the same length as the sections of hose to be operated on, which is usually fifty feet. Motion is imparted to the first carrier-belt B on the table A independently of the other two belts in any desired manner, as by a winch D on the shaft of the pulley C. The other two belts $B'\, B^2$ preferably move together. To this end the fast and loose pulleys $C^{10}\, C^{11}$ are mounted on the shaft $c^9$ of the carrier-belt pulley $C^9$, motion being thus imparted by belt to the third carrier-belt $B^2$. On the shaft $c^7$ of the pulley $C^7$ and on the shaft $c^5$ of the pulley $C^5$ are fixed the pulleys $C^{12}\, C^{13}$, respectively, connected by belt D, so that motion is conveyed from carrier-belt $B^2$ to carrier-belt $B'$. If desired, however, all three carriers may be arranged to move independently of each other.

L is the discharge-nozzle of the tubing-machine, out of which the seamless tube H is delivered upon the first carrier-belt B. This carrier-belt is given a motion forward in the direction of the arrow at the same speed as the tube is delivered from the machine until the desired length—say fifty feet—is fed out, when it is cut off and rolled to one side.

The table A is preferably somewhat wider than the others, affording a space on one side for the accumulation of several lengths of hose, as shown in Fig. 2.

Powdered soapstone is blown into each tube when fresh from the machine, in order to prevent the inner walls of the tube from sticking together. For this purpose an air-blast tube P is provided near one end of the table A, having the peculiarly-shaped nozzle P'. (See Fig. 4.) This nozzle has the hopper $p'$, into which powdered soapstone is introduced. Between the hopper $p'$ and the body of the nozzle P' is the cut-off gate or valve $p^2$, which allows a quantity of the soapstone, when desired, to drop into the nozzle. The nozzle being inserted into the end of the section of hose and the air-blast turned on by means of the cock $p$ a cloud of the soapstone is driven through the tube, thus preventing the inner walls from adhering together.

The metallic pole or mandrel G having been placed upon the central carrier-belt B' is prevented from being carried along as said belt moves by means of a gate or stop $f$, which, when the lever F is down, as shown in the drawings, is in contact with the end of the pole. The lever F is hinged to the top of the table A' near the end thereof, as in Fig. 2. One of the tubes from the table A is now moved forward till its end rests upon the carrier-belt B' on table A'. A knot $h$, Fig. 3, is tied in the end of this tube nearest the tubing-machine, or the end is stopped up in any desired manner to prevent the escape of air, as by means of a plug. The knot is, however, most convenient in practice. The operator then is careful to see that the tube is inflated with air. For this purpose a second air-blast tube R, having a common nozzle R', is provided at the end of the table A, which nozzle is introduced into the open end of the tube and the tube thus inflated. For tubes of small bore or thick material the air-blast is generally unnecessary, as such tubes usually keep their full shape when fresh from the tubing-machine and are sufficiently inflated with air. Large tubes, however, are apt to collapse in such a manner as to need the air-blast to inflate them. The open end of the tube is next drawn a few inches onto the end of the pole resting on the carrier-belt B' till it comes in contact with said carrier, as shown in Fig. 3.

It will readily be seen that as soon as the pole has entered the rubber tube the air contained therein immediately begins to compress and to expand the tube, and by reason of the powdered soapstone (which acts as a dry lubricant) and the escape of compressed air forcing its way out of the tube at the same end at which the pole enters, and by reason, also, of the friction between the movable carrier-belt and the tube resting thereon, the said tube of itself runs through its entire length onto the pole (which is held stationary by the stop $f$) without any further assistance from the operator. The escaping air, as the tube moves along the pole, keeps a thin film of air between it and the pole and, in connection with the powdered soapstone, acts as a lubricant. The tube having been thus forced onto the pole its entire length, the operator then raises the lever F and with it the stop $f$, allowing both pole and tube to move forward upon the carrier-belt $B^2$, which conveys the whole to the wrapping-machine.

The operations of wrapping the hose with cloth, curing it by heat upon the pole, and removing the pole by the aid of a blast of air are similar to those already in use for accomplishing the same purposes in the case of lap-welded hose.

The number of tables employed is immaterial. While three tables arranged as described are most convenient, one table alone—viz., the central table A' with its carrier-belt B'—might alone be employed to force the tube upon the pole, the hose being conveyed thereto and taken therefrom by hand.

I claim—

The herein-described process in the manufacture of seamless hose of forcing the rubber tube upon a pole, consisting of first introducing powdered soapstone into said tube, then closing one end thereof and inflating the tube with air, next drawing the open end thereof upon a stationary pole resting upon a movable carrier-belt until said tube comes in contact with said belt, and allowing the friction between the movable belt and tube and the escape of confined air within the tube to automatically force it onto the pole, substantially as set forth.

In witness whereof I have hereunto set my hand.

ERNEST N. FOOTE.

Witnesses:
HENRY GOLDSMITH,
ISAAC GOLDSMITH.